US009997053B2

(12) United States Patent
Maneskiold et al.

(10) Patent No.: US 9,997,053 B2
(45) Date of Patent: Jun. 12, 2018

(54) SURVEILLANCE SYSTEM WITH MOTION DETECTION AND SUPPRESSION OF ALARMS IN NON-ALARM AREAS (71) Applicant: Mindmancer AB, Gothenburg (SE)

(72) Inventors: Andreas Maneskiold, Gothenburg (SE); Johnny Berlic, Gothenburg (SE)

(73) Assignee: Irisity AB, Göteborg (SE)

(*) Notice: Subject to any disclaimer, the term of this patent is extended or adjusted under 35 U.S.C. 154(b) by 150 days.

(21) Appl. No.: 14/421,373

(22) PCT Filed: May 15, 2013

(86) PCT No.: PCT/SE2013/050542
§ 371 (c)(1),
(2) Date: Feb. 12, 2015

(87) PCT Pub. No.: WO2014/031056
PCT Pub. Date: Feb. 27, 2014

(65) Prior Publication Data
US 2015/0235551 A1    Aug. 20, 2015

(30) Foreign Application Priority Data
Aug. 20, 2012  (SE) ..................... 1250935

(51) Int. Cl.
G08B 19/00    (2006.01)
G08B 25/00    (2006.01)
G08B 13/22    (2006.01)
H04N 7/18     (2006.01)

(52) U.S. Cl.
CPC .......... G08B 25/001 (2013.01); G08B 13/22 (2013.01); H04N 7/18 (2013.01)

(58) Field of Classification Search
CPC ......... G08B 19/00; G08B 25/001; G06K 9/68
See application file for complete search history.

(56) References Cited

U.S. PATENT DOCUMENTS 6,097,429 A    8/2000  Seeley et al.
6,628,835 B1   9/2003  Brill et al.
7,864,980 B2   1/2011  Evans
(Continued)

FOREIGN PATENT DOCUMENTS

GB       2257598 A       1/1993
WO    1998047117 A1     10/1998

OTHER PUBLICATIONS

Supplementary European Search Report dated Feb. 16, 2016 for EP Application No. EP 13 83 0296, 4 pages.
(Continued)

Primary Examiner — Sathyanaraya V Perungavoor
Assistant Examiner — Patricia I Young
(74) Attorney, Agent, or Firm — RMCK Law Group PLC (57) ABSTRACT The present invention relates to a method for a surveillance system, comprising the steps of receiving an image from a surveillance camera capturing a sequence of images of a predetermined area, detecting motion within the predetermined area, generating an alarm if motion is detected, determining the type of alarm, setting a non-alarm area within the image if the type of alarm is determined to be on a list of predefined alarm types, and suppressing, for a predefined time period, detection of motion in the non-alarm area. The invention also relates to a corresponding surveillance system and a computer program product.

20 Claims, 3 Drawing Sheets (56) References Cited

U.S. PATENT DOCUMENTS

2007/0291117 A1    12/2007   Velipasalar et al.
2008/0100704 A1    5/2008   Venetianer et al.
2011/0157358 A1    6/2011   Bell

OTHER PUBLICATIONS

PCT International Search Report dated Jul. 3, 2014 for PCT International Application No. PCT/SE2013/050542, 4 pages.

Fig. 3

SURVEILLANCE SYSTEM WITH MOTION DETECTION AND SUPPRESSION OF ALARMS IN NON-ALARM AREAS

CROSS-REFERENCE TO RELATED APPLICATIONS

This application is a 371 U.S. National Stage of International Application No. PCT/SE2013/050542, filed May 15, 2013, which claims priority to Swedish Patent Application No. 1250935-2, filed Aug. 20, 2012. The disclosure of each of the above applications is incorporated herein by reference in their entirety.

TECHNICAL FIELD

The present invention relates to a method for a surveillance system. The invention also relates to a corresponding surveillance system and a computer program product.

BACKGROUND OF THE INVENTION

In using a conventional surveillance system, a plurality of cameras are typically used for monitoring and surveillance of different locations of interest, where the video streams generated by the plurality of cameras are summoned to a human operator for deciding if any abnormalities exists. In some instances, the surveillance system may additionally comprise a computer system performing video processing of the video streams, such that the human operator only needs to be involved if the computer system automatically has decided that an abnormality is present, e.g. a possible alarm condition that needs interaction by the human operator.

The introduction of the above mentioned computer system drastically minimized the cost of labor, allowing the human operator to monitor a further plurality of video streams. However, in maximizing the number of video streams handled by a single operator, the work involved tends to be very tedious, thus possibly reducing the monitoring and observation quality. This is specifically valid for repeating spurious alarms taking place at the same location.

Thus, it would be desirable to improve the monitoring condition for the human operator, including reducing the number of spurious alarms presented to the operator.

SUMMARY OF THE INVENTION

According to an aspect of the invention, the above is at least partly met by a method for a surveillance system, comprising the steps of receiving an image from a surveillance camera capturing a sequence of images of a predetermined area, detecting motion within the predetermined area, generating an alarm if motion is detected, determining the type of alarm, setting a non-alarm area within the image if the type of alarm is determined to be on a list of predefined alarm types, and suppressing, for a predefined time period, detection of motion in the non-alarm area.

By means of the invention, if an alarm is determined to be on a list of predetermined types (where an alarm type typically is defined as relating to motion of e.g. non-human objects, human motion according to a specific pattern, animal motion, and/or noise, etc., being of the spurious type but still generating an alarm), a non-alarm area may be set within the image (i.e. being a sub-section of the predetermined area, the predetermined area typically being an area of interest and in need of surveillance) for allowing a time based suppression of further alarms. Such suppression advantageously minimizes repeated spurious alarms, as only a "first" alarm will need to be further processed, possibly by a human operator. Any subsequent alarms originating from a non-alarm area within the predetermined area will be suppressed (during the predefined suppression time period), however still allowing for monitoring/surveillance/motion detection of the remaining part of the predetermined area (i.e. the parts(s) of the image not including the non-alarm area). Accordingly, a single as well as a plurality of non-alarm areas may be set within the same predetermined area, possibly having some overlaps in relation to each other, and having the same or different predefined suppression time periods. It should be noted that the non-alarm area may cover only a portion of the predetermined area, or the full predetermined area. Allowing the non-alarm area to cover the full predetermined area may have some advantages based on the type of functionality applied for motion detection.

Preferably, the type of alarm may for example be used in defining the suppression time period. Alternatively, the predefined suppression time period may be fixed or adjustable in the same manner for all type of alarms.

Additionally, a timer for comparison with the predefined suppression time period may be reset in case a further (second) alarm takes place during the predefined suppression time period, actively increasing (e.g. doubling in case of two subsequent alarms) the time period for suppressing further alarm (typically valid for the case of a single and/or a plurality of overlapping areas). It may also be possible to not simply reset the timer, but instead allow the timer to be reset based on the type of alarm. Furthermore, in case of a plurality of subsequent alarms within the same area, the predefined suppression time period may be allowed to sequentially decrease, i.e. thereby allowing the predefined suppression time period to be shorter and shorter for each subsequent alarm within the same area (e.g. the second alarms only adds an extra 50% to the suppression time period, a third alarm adding an extra 25%, etc.).

Preferably, the motion detection is performed by means of a computerized algorithm operation on the images captured by the surveillance camera. Within the concept of the present invention, it may also (alternatively or additionally) be possible to use further means for performing such motion detection. For example, a PIR sensor (passive infrared sensor) or any other type of occupancy sensor based technology (e.g. based on one of sound, opacity, geomagnetism, reflection of transmitted energy, and vibration) may be used for performing motion detection.

In a preferred embodiment, the determination of the type of alarm may be performed by a human operator (manual/human categorization of the type of alarm). Accordingly, the human operator may decide on the type of alarm, completely manual or by means of a semi-automated process where the user is provided with a selection of "best choices", possibly generated by computer based image processing of the received images (computerized classification of the type of alarm).

In an embodiment of the invention, the list of predefined alarm types may comprise a plurality of different types of spurious alarm conditions. Such types of alarms may typically relate to spurious alarms generated by e.g. different types of animals (and related movement patterns), cloud based distractions (e.g. clouds moving over a clear sky), different (general) moving objects (e.g. a part of a tarpaulin moving in the wind, etc.), a human moving in the "wrong direction".

In a preferred embodiment, it may also be possible to allow subsequent alarms to be generated within a non-alarm area in case the type of the subsequent alarm differs from the type of alarm that was initially determined when setting the non-alarm area. Hence, in case the non-alarm area was type-set based on a part of a tarpaulin moving in the wind, a subsequent alarm being based on e.g. a person or vehicle moving within the area would still generate an alarm to be verified e.g. by the human operator.

Advantageously, the step of generating an alarm may further comprise determining a location of the alarm within the image, the non-alarm area being based on the location of the alarm. Accordingly, the location or the alarm typically relates to the area within the image where motion was detected (typically valid for image based motion detection). Alternatively, the non-alarm area may be set by a human operator. Preferably, the non-alarm area is set slightly larger than the area where motion is detected (typically valid for image based motion detection). Additionally, in a semi-automated process as discussed above, the selection of alarm type(s) provided to the human operator may be based on the location of the alarm.

According to another aspect of the present invention there is provided a surveillance system, comprising at least one surveillance camera capturing a sequence of images of a predetermined area, a control unit connected to the at least one surveillance camera, wherein the control unit is configured to detect motion within the predetermined area, generate an alarm if motion is detected, set a non-alarm area within the image if the type of alarm is determined to be on a list of predefined alarm types, and suppress, for a predefined time period, detection of motion in the non-alarm area. This aspect of the invention provides similar advantages as discussed above in relation to the previous aspect of the invention.

Preferably, the control unit is further configured to receive, through a user interface, an indication of the alarm type from the human operator. As stated above, this allows a human interaction to take place for deciding if the "first" alarm in fact is of the spurious type.

According to a still further aspect of the present invention there is provided a computer program product comprising a computer readable medium having stored thereon computer program means for controlling a surveillance system, wherein the computer program product comprises code for receiving an image from a surveillance camera capturing a sequence of images of a predetermined area, code for detecting motion within the predetermined area, code for generating an alarm if motion is detected, code for determining the type of alarm, code for setting a non-alarm area within the image if the type of alarm is determined to be on a list of predefined alarm types, and code for suppressing, for a predefined time period, detection of motion in the non-alarm area.

The control unit is preferably a micro processor (possibly integrated within the camera), any other type of computing device e.g. arrange in proximity of the camera or at the monitoring site of the human operator. Similarly, the computer readable medium may be any type of memory device, including one of a removable nonvolatile random access memory, a hard disk drive, a floppy disk, a CD-ROM, a DVD-ROM, a USB memory, an SD memory card, or a similar computer readable medium known in the art.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Figure 1:
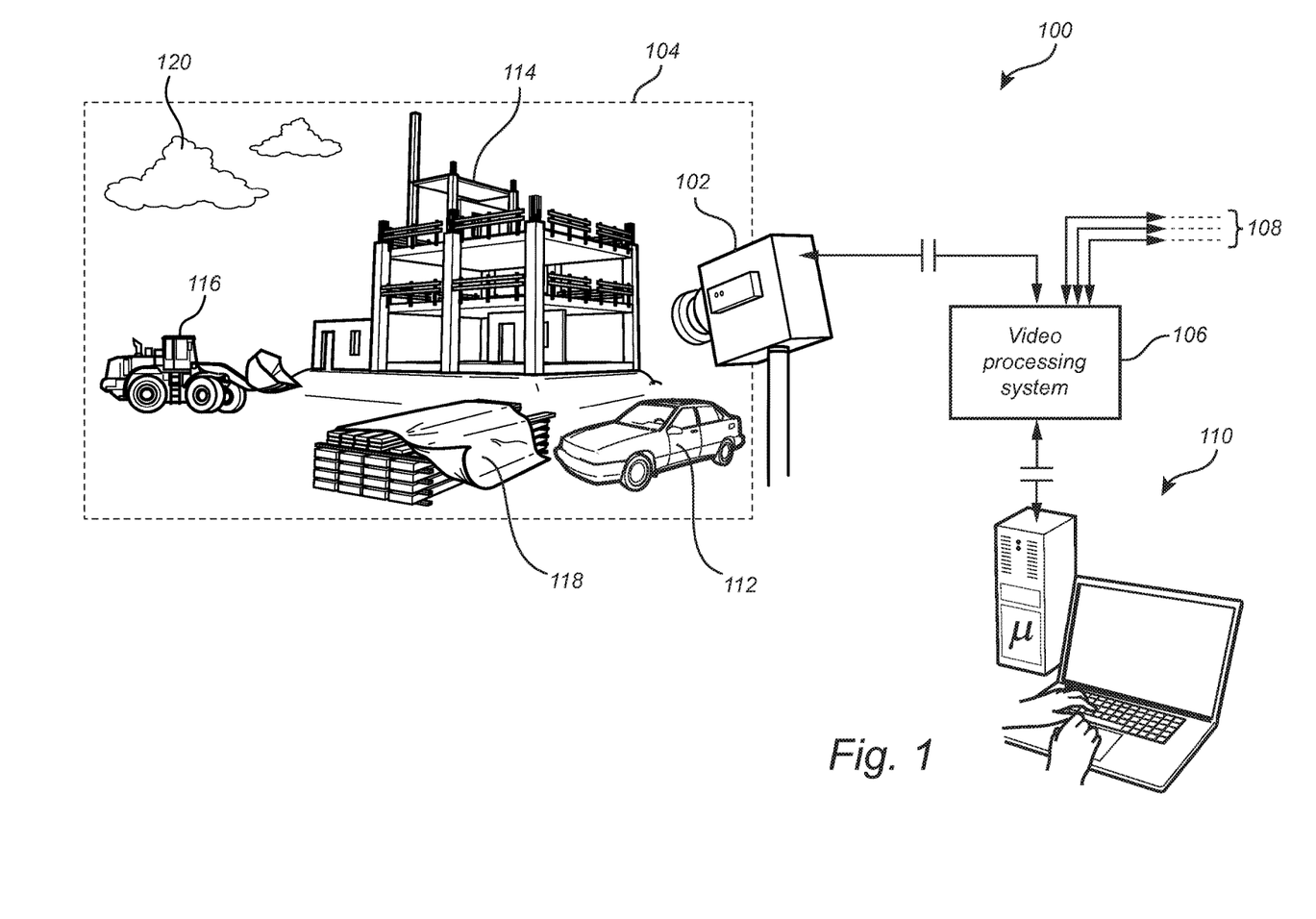
FIG. 1 illustrates a surveillance system according to a currently preferred embodiment of the invention.

Referring now to the drawings and to FIG. 1 in particular, there is depicted a surveillance system 100 according to a possible embodiment of the invention. The surveillance system 100 comprises at least one camera 102 provided for surveillance and security purposes for monitoring a predetermined area 104 (e.g. area of interest), in the illustrated embodiment a part of a construction site. The camera 102 may be an analog or digital camera and may contain varying levels of video storage and video processing capabilities, capturing a stream of images of the predetermined area 104 with a frame rate (FPS) of e.g. 30 images per second. Any other frame rate is of course possible and within the scope of the invention, for example a lower frame rate may be suitable for minimizing the data generated by the surveillance system 100. A single or a plurality of cameras 102 may be used in relation to the invention. The stream of images (video stream) is processed by a video processing system 106, for example arranged to detect if any motion exists within the stream of captured images using image using e.g. known motion detection algorithms.

The video processing system 106 may include a general purpose processor, an application specific processor, a circuit containing processing components, a group of distributed processing components, a group of distributed computers configured for processing, etc. The processor may be or include any number of hardware components for conducting data or signal processing or for executing computer code stored in memory. A processor may also be included in camera(s) 102. The memory may be one or more devices for storing data and/or computer code for completing or facilitating the various methods described in the present description. The memory may include volatile memory or non-volatile memory. The memory may include database components, object code components, script components, or any other type of information structure for supporting the various activities of the present description. According to an exemplary embodiment, any distributed or local memory device may be utilized with the systems and methods of this description. According to an exemplary embodiment the memory is communicably connected to the processor (e.g., via a circuit or any other wired, wireless, or network connection) and includes computer code for executing one or more processes described herein.

The video processing system 106 may be arranged in close vicinity of the camera 102, e.g. at the construction site, or may be provided at a remote location, where the stream of images captured by the camera 102 is transmitted to the video processing system 106. Accordingly, the functionality and processing provided by means of the invention may e.g. be distributed between the camera 102, the video processing system 106, and possible further electronic processing equipment provided in relation to the surveillance system 100. Such further electronic processing equipment may for example be "cloud-computing based".

The transmission may be wired or wireless, including for example wired connections like a building LAN, a WAN, an Ethernet network, an IP network, etc., and wireless connections like WLAN, CDMA, GSM, GPRS, 3G mobile communications, 4G mobile communications, Bluetooth, infrared, or similar. The video processing system 106 may be arranged to process a stream of images from a single or a plurality of cameras 102/108. The surveillance system 100 further comprises a computer terminal 110 provided with e.g. a graphical control interface to be handled by a human operator, e.g. for determining the type of alarm detected by the video processing system 106 and/or for providing feedback, initiating an on-site watchman review of the alarm, etc.

In an exemplary embodiment, the predetermined area 104, e.g. the construction site, comprises a plurality of different objects, fixed and mobile, being visual within the stream of images captured by the camera 102. For example, at the construction site there may be positioned a vehicle 112, a building being under construction 114, an excavator 116, a pile of beams and planks covered by a tarpaulin 118, and a plurality of clouds 120 moving over a clear sky.

Figure 2:
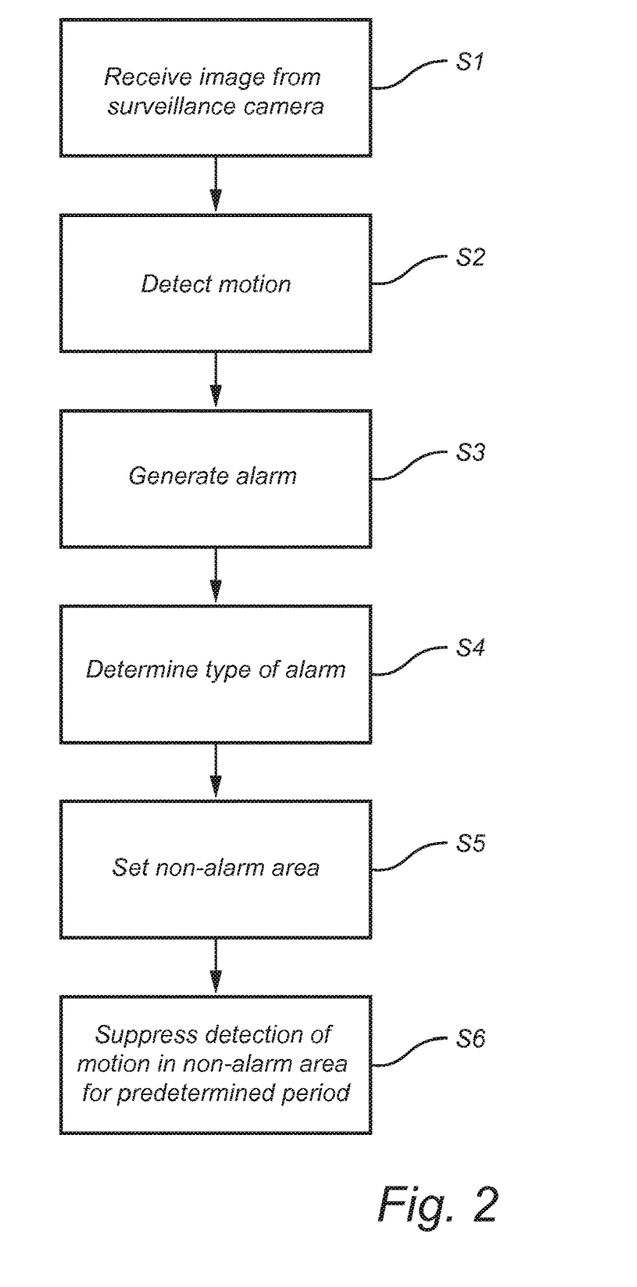
FIG. 2 shows a flow chart of a method according to an embodiment of the invention.
Figure 3:
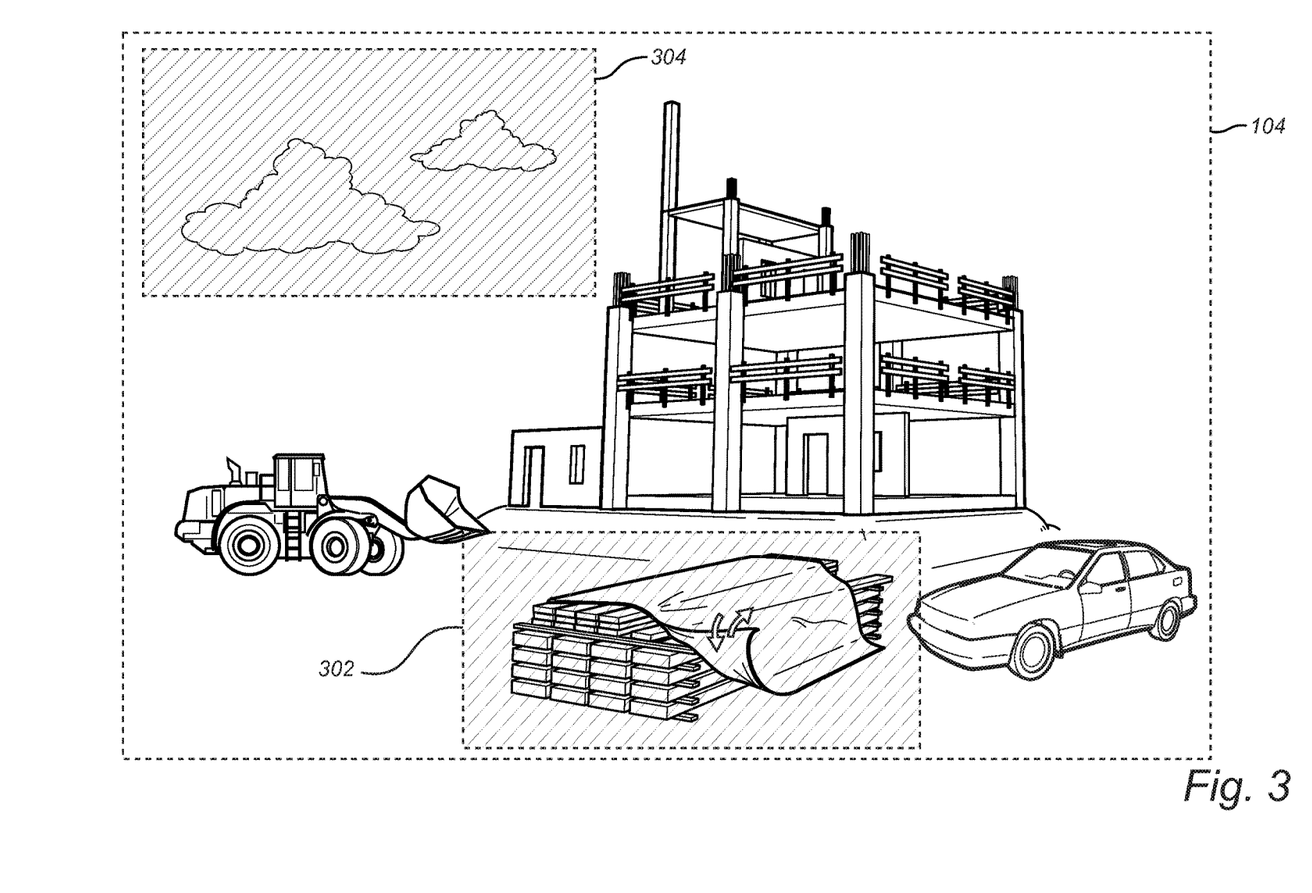
FIG. 3 conceptually illustrates the operation of the surveillance system according to the invention.

During operation of the surveillance system 100, with further reference to FIGS. 2 and 3, the video processing system 106 receives, S1, images from the camera 102. The video processing system 106 determines of motion is detected, S2, for example using known motion detection algorithms e.g. including comparison of subsequently captured image frames. As discussed above, the functionality provided by means of the invention may be executed solely by the video processing system 106 or in a combined effort by the video processing system 106 and the camera 102. Still further, the camera 102 may be equipped with processing functionality for e.g. in itself detect motion within a sequence of captured image frames. In an alternative embodiment and as discussed above, motion detection may alternatively or additionally be generated using PIR based technology (not shown).

If motion is detected, an alarm is generated, S3. The alarm is preferable provided to the human operator through the graphical interface provided at the terminal 110. The alarm may be distributed instantly to the human operator, or may be queued to be handled in e.g. a priority order. In reviewing the alarm, the human operator may be provided with a video sequence relating to the sequences of images captured at (and possibly around) the time motion was detected. Preferably, the video sequence is long enough for allowing the human operator to completely understand the situation at which the motion was detected, e.g. also including at least some time before that motion was detected. On the other hand, the video sequence should be kept as short as possible for maximizing the number of video sequences the human operator may view within a given time frame.

Preferably, the video processing system 106 classifies the detected motion to determine if in fact an alarm should be generated, i.e. prior to generating an alarm. Thus, this will allow the removal of the majority of spurious alarms generated by means of e.g. noise, allowed activities (e.g. movement in a specific direction) within the video sequence, etc. Accordingly, only the alarms that the video processing system 106 "let through" (i.e. categorized as alarms) will be forwarded to the terminal 110.

At detecting motion and/or when generating the alarm, it may be possible for the video processing system 106 (or the camera 102, or a combination, as discussed above) determine, S4, the type of alarm. However, it may also be suitable to allow the human operator to determine the type of alarm when observing the video sequence. Allowing the human operator to determine the type of alarm may minimize any wrongful type classifications automatically made by the video processing system 106. However, new and advanced video processing algorithms are developed and may on the other hand show to be more thorough in comparison to the determination made possible by means of a human operator. According to the invention, either way of alarm-type-classification is possible and within the scope of the invention. Additionally, it may also be possible to allow the alarm-type-classification to be semi-automated, e.g. by allowing the video processing system 106 to suggest a single or a plurality of best matching alarm types to the human operator.

Once the alarm type is determined, and the type is determined to be of the spurious type, a non-alarm area may be set, S5, within the image (e.g. area 104). In the illustrated embodiment, two non-alarm areas 302, 304, are determined. The first non-alarm area 302 relates to the pile of beams and planks covered by the tarpaulin 118. In the illustrated embodiment, the tarpaulin 118 has not been completely fixed around the pile, such that a section of the tarpaulin 118 is allowed to "move" in the wind. The second non-alarm area 304 relates to the plurality of clouds 120 moving over the clear sky. As understood from the above, in case of a breeze, the tarpaulin 118 as well as the clouds 120 will move and possible generate motion to be detected by the video processing system 106. The detected motion will likely cover a limited section of the area 104, and hence the non-alarm areas 302, 304 are allowed to cover the specific area where motion is detected plus an extension such that in case further movement happens, it will likely take place within the slightly larger non-alarm area 302, 304. As discussed above, a single as well as a plurality of non-alarm areas may be set within the area 104 captured by the camera 102.

Additionally, the non-alarm areas may also be overlapping. Further, the non-alarm areas 302, 304 may be set manually by the human operator through the graphical interface of the terminal 110, the video processing system 106 or by a combination of the two. Furthermore, the size of the non-alarm area may be depending on the type of alarm. For example, in case of determining that the spurious is from the tarpaulin 118 moving in the wind, a non-alarm area only being slightly larger than the exact position where motion is detected may be set. Conversely, in case the motion is generated by moving clouds, a larger horizontal area may be set, covering possible further movement of the clouds. In case of smaller animals moving within the area 104, a non-alarm area may be set based on subsequent alarms generating overlapping non-alarm areas. Accordingly, in FIG. 3, the non-alarm areas 302, 304 are illustrated as rectangular areas, however it should be noted that any type of forms are possible and within the scope of the invention.

Following setting the non-alarm areas 302, 304, a predetermined suppression time is initiated, allowing further motion taking place within non-alarm areas 302, 304 to be suppressed, S6. The predetermined suppression time may be fixed or adjustable, as discussed above. The predetermined suppression time may also be set based on the determined type of alarm. For example, in case of the tarpaulin 118 moving in the wind, it is likely that motion will be generated during an extended time period, and thus the predetermined suppression time may be made (in comparison) long (e.g. hours). However, in case of motion initiated by e.g. a smaller animal, the predetermined suppression time may be made (in comparison) short (e.g. minutes); as such motion should not suppress motion in fact generated by e.g. a human entering the area 104.

Still further, the location of the detected motion may influence the predetermined suppression time. For example, in case of motion within the higher sections of the area, it may be determined that it is highly unlikely that e.g. any human movement would be present in such a section of the predetermined area 104.

The actual implementation of suppressing further movement within a non-alarm area 302, 304, may be implemented in different ways and depending on e.g. the type of equipment comprised with the surveillance system 100. For example, the initiation of a non-alarm area may be provided as a feedback to the video processing system 106, or to the camera 102, e.g. by the human operator through the graphical interface of the terminal 110. That is, the camera 102 may for example be re-configured to not capture an image within a portion of its active capturing area (e.g. in case of a CMOS image sensor) during the predetermined suppression time (active sensor masking). However, such an implementation (i.e. suppression of the sensor capture area) may remove the possibility to allow different (i.e. other) types alarms to be forwarded to the terminal 110. Accordingly, it may be preferred not to "physically" block a specific section of the sensor capture area, but rather allow the suppression to be "virtual" and possibly connected to a single alarm type.

As understood, the above discussed implementation may be provided at any step from capturing the image using the camera 102 up until the image (video stream) is provided to the human operator at the terminal 110.

In summary, the present invention relates to a method for a surveillance system, comprising the steps of receiving an image from a surveillance camera capturing a sequence of images of a predetermined area, detecting motion within the predetermined area, generating an alarm if motion is detected, determining the type of alarm, setting a non-alarm area within the image if the type of alarm is determined to be on a list of predefined alarm types, and suppressing, for a predefined time period, detection of motion in the non-alarm area.

By means of the invention, if an alarm is determined to be of the spurious type, an alarm area may be set within the image (i.e. being a sub-section of the predetermined area, the predetermined area typically being an area of interest and in need of surveillance) for allowing a time based suppression of further alarms. Such suppression advantageously minimizes repeated spurious alarms, as only a "first" alarm will need to be further processed, possibly by a human operator. Any subsequent alarms originating from a non-alarm area within the predetermined area will be suppressed, however still allowing for monitoring/surveillance/motion detection of the remaining part of the predetermined area (i.e. the parts(s) of the image not including the non-alarm area). Accordingly, a single as well as a plurality of non-alarm areas may be set within the same predetermined area, possibly having some overlaps in relation to each other, and having the same or different predefined suppression time periods.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

Variations to the disclosed embodiments can be understood and effected by the skilled addressee in practicing the claimed invention, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A method for a surveillance system, comprising:
   receiving, at a computing device having one or more processors, a sequence of images of a predetermined area from a surveillance camera;

utilizing, at the computing device, a motion detection algorithm to detect motion in the predetermined area based on the sequence of images;
when motion is detected, generating, at the computing device, an alarm notification;
obtaining, at the computing device, a type of alarm condition associated with the alarm notification;
comparing, at the computing device, the type of alarm condition with a plurality of predefined alarm types associated with a spurious type of alarm, wherein the spurious type of alarm corresponds to detected motion related to noise in the images, allowed movement, movement or movement patterns corresponding to animals, or cloud based movement; and
when the type of alarm condition is one of the plurality of predefined alarm types associated with the spurious type of alarm:
determining, at the computing device, a non-alarm area based on a location in the sequence of images in which the motion was detected,
suppressing, at the computing device and for a predefined time period, detection of motion in the non-alarm area such that the surveillance system will not generate an additional alarm notification when additional motion is detected within the non-alarm area during the predefined time period.

2. The method of claim 1, wherein obtaining the type of alarm condition associated with the alarm notification comprises receiving the type of alarm condition from a human operator operating the computing device in communication with the surveillance system.

3. The method of claim 1, wherein obtaining the type of alarm condition associated with the alarm notification comprises receiving the type of alarm condition from the computing device in communication with the surveillance system, the computing device performing image processing of one or more images of the sequence of images to classify the detected motion as the type of alarm condition.

4. The method of claim 1, wherein determining the non-alarm area comprises receiving an identification of the non-alarm area from a human operator operating the computing device in communication with the surveillance system.

5. The method of claim 1, wherein the non-alarm area corresponds to the location in the sequence of images in which the motion was detected and an extension such that the non-alarm area is larger than the location in which the motion was detected.

6. The method of claim 1, further comprising:
determining, at the computing device, a motion type of the detected motion based on one or more characteristics of the detected motion;
associating, at the computing device, the type of alarm condition with the motion type;
detecting, at the computing device, additional motion during the predefined time period;
determining, at the computing device, an additional motion type of the detected additional motion based on one or more characteristics of the detected additional motion; and
comparing, at the computing device, the additional motion type of the additional motion to the motion type of the detected motion,
wherein suppressing detection of motion in the non-alarm area during the predefined time period comprises:

when the additional motion type does not match the motion type, generating the additional alarm notification; and
when the additional motion type does match the motion type, suppressing the additional motion such that the additional alarm notification is not generated.

7. The method of claim 1, wherein the predefined time period is set based on the type of alarm condition.

8. A surveillance system, comprising:
at least one surveillance camera capturing a sequence of images of a predetermined area; and
one or more computing devices connected to the at least one surveillance camera, wherein the one or more computing devices are configured to:
receive a sequence of images of a predetermined area from the at least one surveillance camera;
utilize a motion detection algorithm to detect motion in the predetermined area based on the sequence of images;
when motion is detected, generate an alarm notification;
obtain a type of alarm condition associated with the alarm notification;
compare the type of alarm condition with a plurality of predefined alarm types associated with a spurious type of alarm, wherein the spurious type of alarm corresponds to detected motion related to noise in the images, allowed movement, movement or movement patterns corresponding to animals, or cloud based movement; and
when the type of alarm condition is one of the plurality of predefined alarm types associated with the spurious type of alarm:
determine a non-alarm area based on a location in the sequence of images in which the motion was detected,
suppress, for a predefined time period, detection of motion in the non-alarm area such that the surveillance system will not generate an additional alarm notification when additional motion is detected within the non-alarm area during the predefined time period.

9. The surveillance system of claim 8, wherein obtaining the type of alarm condition associated with the alarm notification comprises receiving the type of alarm condition from a human operator.

10. The surveillance system of claim 8, wherein obtaining the type of alarm condition associated with the alarm notification comprises performing image processing of one or more images of the sequence of images to classify the detected motion as the type of alarm condition.

11. The surveillance system of claim 8, wherein determining the non-alarm area comprises receiving an identification of the non-alarm area from a human operator.

12. The surveillance system of claim 8, wherein the non-alarm area corresponds to the location in the sequence of images in which the motion was detected and an extension such that the non-alarm area is larger than the location in which the motion was detected.

13. The surveillance system of claim 8, wherein the one or more computing devices are further configured to:
determine a motion type of the detected motion based on one or more characteristics of the detected motion;
associate the type of alarm condition with the motion type;
detect additional motion during the predefined time period;

determine an additional motion type of the detected additional motion based on one or more characteristics of the detected additional motion; and
compare the additional motion type of the additional motion to the motion type of the detected motion,
wherein suppressing detection of motion in the non-alarm area during the predefined time period comprises:
when the additional motion type does not match the motion type, generating the additional alarm notification; and
when the additional motion type does match the motion type, suppressing the additional motion such that the additional alarm notification is not generated.

14. The surveillance system of claim 8, wherein the predefined time period is set based on the type of alarm condition.

15. A non-transitory computer-readable storage medium having a plurality of instructions stored thereon, which, when executed by a computing device having one or more processors, cause the computing device to perform operations comprising:
receiving a sequence of images of a predetermined area from a surveillance camera;
utilizing a motion detection algorithm to detect motion in the predetermined area based on the sequence of images;
when motion is detected, generating an alarm notification;
obtaining a type of alarm condition associated with the alarm notification;
comparing the type of alarm condition with a plurality of predefined alarm types associated with a spurious type of alarm, wherein the spurious type of alarm corresponds to detected motion related to noise in the images, allowed movement, movement or movement patterns corresponding to animals, or cloud based movement; and
when the type of alarm condition is one of the plurality of predefined alarm types associated with the spurious type of alarm:
determining a non-alarm area based on a location in the sequence of images in which the motion was detected,
suppressing, for a predefined time period, detection of motion in the non-alarm area such that the surveillance system will not generate an additional alarm notification when additional motion is detected within the non-alarm area during the predefined time period.

16. The non-transitory computer-readable storage medium of claim 15, wherein obtaining the type of alarm condition associated with the alarm notification comprises receiving the type of alarm condition from a human operator operating the computing device in communication with a surveillance system.

17. The non-transitory computer-readable storage medium of claim 15, wherein obtaining the type of alarm condition associated with the alarm notification comprises performing image processing of one or more images of the sequence of images to classify the detected motion as the type of alarm condition.

18. The non-transitory computer-readable storage medium of claim 15, wherein determining the non-alarm area comprises receiving an identification of the non-alarm area from a human operator operating the computing device in communication with a surveillance system.

19. The non-transitory computer-readable storage medium of claim 15, wherein the non-alarm area corresponds to the location in the sequence of images in which the motion was detected and an extension such that the non-alarm area is larger than the location in which the motion was detected.

20. The non-transitory computer-readable storage medium of claim 15, wherein the operations further comprise:
determining a motion type of the detected motion based on one or more characteristics of the detected motion;
associating the type of alarm condition with the motion type;
detecting additional motion during the predefined time period;
determining an additional motion type of the detected additional motion based on one or more characteristics of the detected additional motion; and
comparing the additional motion type of the additional motion to the motion type of the detected motion,
wherein suppressing detection of motion in the non-alarm area during the predefined time period comprises:
when the additional motion type does not match the motion type, generating the additional notification; and
when the additional motion type does match the motion type, suppressing the additional motion such that the additional alarm notification is not generated.

* * * * *